United States Patent
Ohana et al.

(10) Patent No.: US 9,888,073 B2
(45) Date of Patent: Feb. 6, 2018

(54) SYSTEM AND METHOD FOR MANAGING A COLLECTIVE DATA TRANSFER RATE OF A PLURALITY OF EDGE DEVICES

(71) Applicant: FLIR Commercial Systems, Inc., Goleta, CA (US)

(72) Inventors: Lior Ohana, Netanya (IL); Rony Atoun, Tel-Aviv (IL)

(73) Assignee: FLIR Commercial Systems, Inc., Goleta, CA (US)

( * ) Notice: Subject to any disclaimer, the term of this patent is extended or adjusted under 35 U.S.C. 154(b) by 226 days.

(21) Appl. No.: 14/739,054

(22) Filed: Jun. 15, 2015

(65) Prior Publication Data

US 2016/0366219 A1 Dec. 15, 2016

(51) Int. Cl.
*G06F 15/16* (2006.01)
*H04L 29/08* (2006.01)
*H04L 29/14* (2006.01)

(52) U.S. Cl.
CPC .......... *H04L 67/1095* (2013.01); *H04L 67/10* (2013.01); *H04L 67/1034* (2013.01); *H04L 67/12* (2013.01); *H04L 67/32* (2013.01); *H04L 69/40* (2013.01)

(58) Field of Classification Search
CPC ... H04L 1/0002; H04L 43/0894; H04L 47/25; H04L 67/10; H04L 67/1034; H04L 67/1095; H04L 67/12; H04L 67/32; H04L 69/40; H04W 24/02; H04W 28/22
See application file for complete search history.

(56) References Cited

U.S. PATENT DOCUMENTS

| | | | | |
|---|---|---|---|---|
| 2002/0069417 A1* | 6/2002 | Kliger | ................. | H04L 12/2803 725/78 |
| 2002/0193118 A1* | 12/2002 | Jain | ........................ | H04W 28/12 455/453 |
| 2005/0271044 A1* | 12/2005 | Hsu | ........................ | H04L 12/40 370/360 |
| 2006/0245355 A1* | 11/2006 | Iwamura | ............. | H04L 12/5695 370/232 |
| 2007/0073895 A1* | 3/2007 | Sebire | ..................... | H04L 47/10 709/230 |
| 2010/0064337 A1* | 3/2010 | Dvir | ......................... | H04N 5/76 725/115 |
| 2012/0039391 A1* | 2/2012 | Frusina | .................. | H04L 47/25 375/240.07 |
| 2015/0098576 A1* | 4/2015 | Sundaresan | ............ | H04R 29/00 381/58 |
| 2015/0117195 A1* | 4/2015 | Toy | ........................ | H04L 47/263 370/232 |
| 2015/0350018 A1* | 12/2015 | Hui | ........................ | H04L 47/11 370/254 |
| 2016/0140359 A1* | 5/2016 | Mukherjee | .......... | G06F 21/6263 726/26 |

* cited by examiner

*Primary Examiner* — Christopher Biagini
(74) *Attorney, Agent, or Firm* — Haynes and Boone, LLP (57) ABSTRACT

A system and method of managing a collective data transfer rate of a plurality of edge devices may include designating, by the plurality of edge devices, one of the plurality of the edge devices a master device. A data transfer rate of each of the plurality of edge devices may be controlled based on at least one flag of the edge device, the at least one flag set the designated master device. The designated master device may dynamically set the at least one flag of each of the plurality of edge devices such that controlling the data transfer rate by the plurality of edge devices is synchronized.

15 Claims, 3 Drawing Sheets

SYSTEM AND METHOD FOR MANAGING A COLLECTIVE DATA TRANSFER RATE OF A PLURALITY OF EDGE DEVICES

FIELD OF THE INVENTION

The present invention relates generally to managing a plurality of edge devices. More specifically, the present invention relates to automatic and autonomous management of a data transfer rate of a plurality of edge devices.

BACKGROUND OF THE INVENTION

Network edge devices are known in the art. For example, edge devices that include a computing device and a camera may be deployed in a remote site, e.g., for surveillance, security or other purposes. To manage the collective data transfer rate of a set of edge devices in a site, some of the known systems and methods configure each of the edge devices, e.g., using remote access. Other known systems and methods use a server at the remote site in order to configure or control the edge devices. However, a remote server may fail or be disconnected from a network and configuring each of the remote edge devices may be costly and error prone.

SUMMARY OF THE INVENTION

A system and method of managing a collective data transfer rate of a plurality of edge devices may include designating, by a plurality of edge devices, one of the plurality of the edge devices a master device. A system and method may include controlling, by each edge device, a data transfer rate of the edge device based on at least one flag of the edge device, the at least one flag set by the designated master device. A system and method may include dynamically setting, by the designated master device, the at least one flag for each of the plurality of edge devices, such that controlling the data transfer rate by the plurality of edge devices is synchronized.

The plurality of edge devices may include a camera and controlling the data transfer rate may include controlling one of: a frame rate of the camera and a resolution of the camera.

A system and method may include, at each edge device, if network congestion has been detected and a "Down" flag of the edge device is set to "true" then reducing the data transfer rate of the edge device by a predefined step and setting the "Down" flag of the edge device to "false". A system and method may include, at a designated master device, if the "Down" flags of all edge devices are set to "false" then setting the "Down" flags of all edge devices to "true".

A system and method may include, at each edge device, if excess network bandwidth is detected and an "Up" flag of the edge device is set to "true", then increasing the data transfer rate of the edge device and setting the "Up" flag of the edge device to "false", and at the designated master device, if the "Up" flags of all edge devices are set to "false", then set all "Up" flags of all edge devices to "true".

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
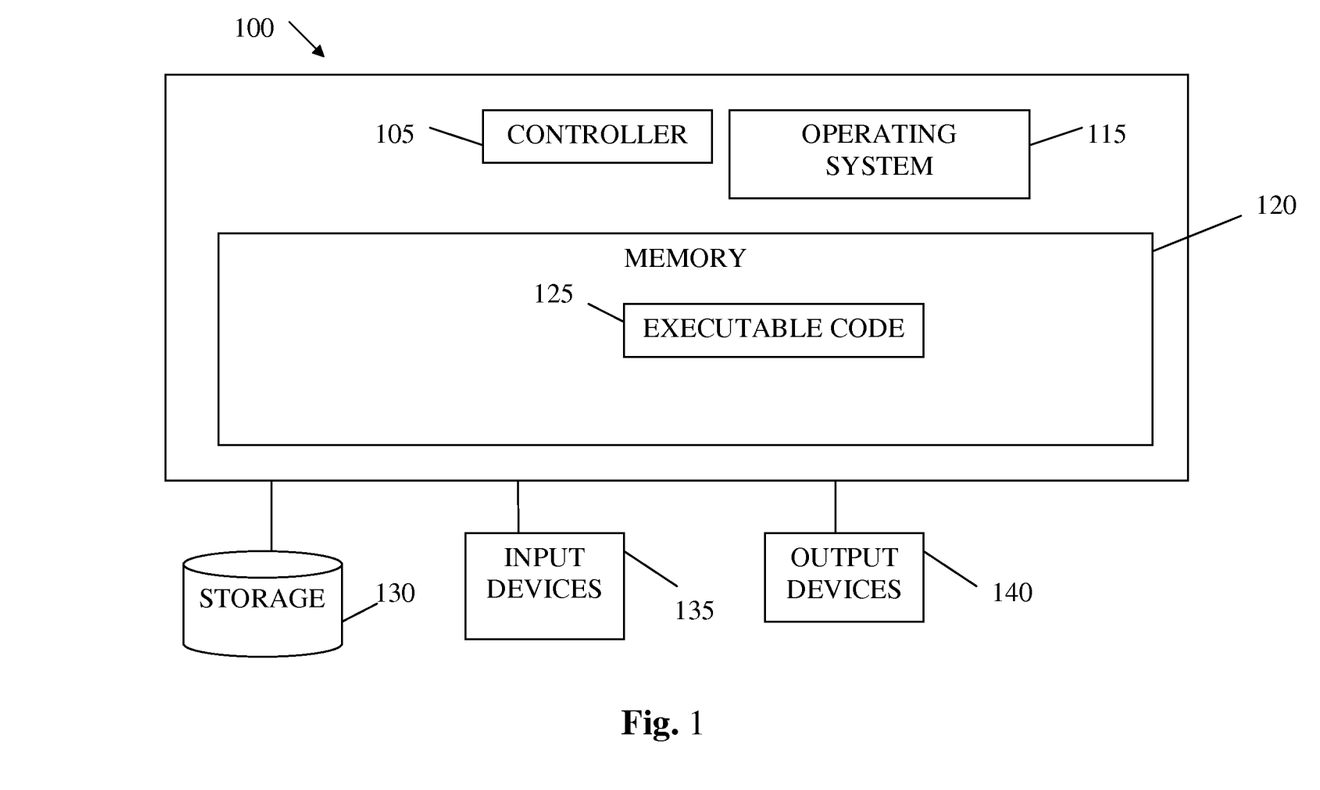
FIG. 1 shows high level block diagram of an exemplary computing device according to some embodiments of the present invention.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc. More than one computing device 100 may be included in a system, according to some embodiments of the invention, and one or more computing devices 100 may act as the various components of a system. For example, each of the edge devices described herein may be, or may include, components of computing device 100. For example, by executing executable code 125 stored in memory 120, controller 105 may be configured to carry out a method of managing a collective data transfer rate of a plurality of edge devices.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may be a computer or processor non-transitory readable medium or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that manages a collective data transfer rate of a plurality of edge devices as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein may be, or may include, controller 105 and executable code 125.

Storage 130 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include sensors or other components, e.g., a camera, a microphone, a motion detector and the like. Other components that may be included in input devices 135 may be a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

Some embodiments may be provided in a computer program product that may include a non-transitory machine-readable medium, stored thereon instructions, which may be used to program a computer, controller, or other programmable devices, to perform methods as disclosed herein. Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

An embodiment of system and method according to the invention may enable, or include, managing a collective data transfer rate of a plurality of edge devices, e.g., a plurality of edge devices in a remote site. Managing a collective data transfer rate of a plurality of edge devices by an embodiment of system and method according to the invention may enable maintaining a server-less site. For example, a plurality of edge devices that may include cameras or other sensors may appear to a user or to a system as a single remote site. For example, data transfer rate may be managed for the site without having to manage, or directly communicate with, each of the edge devices in the site.

According to some embodiments of the invention, a plurality of edge devices may automatically collaborate to autonomously designate one of the edge devices as a master device or master unit. Each of the edge devices may control its data transfer rate based on one or more flags that may be manipulated by the designated master device. The master unit may manipulate the flags of the edge devices such that the overall, global or total network data transfer rate generated by the plurality of edge devices is kept at a desired level. The master unit may manipulate the flags of the edge devices such that the cumulative data transfer rate generated by the plurality of edge devices is kept at a maximal level while avoiding congestion. The master unit may control or manage the edge devices such that the cumulative data transfer rate generated by the plurality of edge devices is kept at a desired or configured level.

Other aspects of a group of edge devices may be managed or controlled by an embodiment of the invention. For example, a total or cumulative peak data rate may be controlled for a group, set or plurality of edge devices.

The term "edge device" as referred to herein may be or may relate to any computing device that is, or that provides, an entry point into a system or into a network. For example, an edge device may be a computing device (e.g., similar to computing device 100) that is connected to a network.

The terms "data rate", "transfer rate" and "bandwidth" as referred to herein may be, or may relate to, the amount of information transmitted over a network in a given amount of time. For example, these terms may be or may relate to the rate with which data is transferred through or over a network, e.g., as known in the art and measured in binary digits (bits) or bytes per second.

The terms "collective data rate" and "collective transfer rate" as referred to herein may be, or may relate to, the cumulative, total or aggregated data or transfer rate of a plurality of devices. For example, a collective data rate or a collective transfer rate may be the sum of the data rates or transfer rates of a plurality of edge devices.

Figure 2:
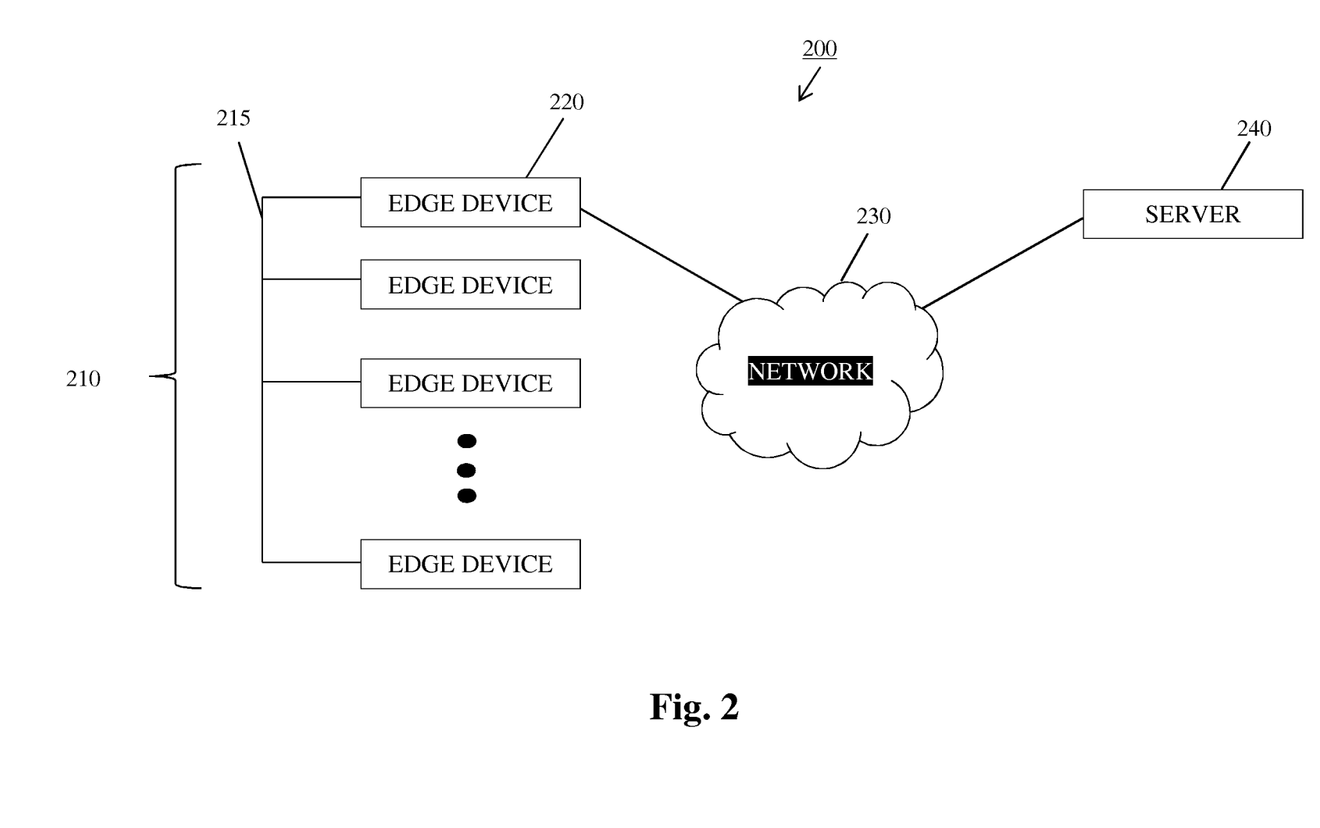
FIG. 2 is an overview of a system according to some embodiments of the present invention.

Reference is made to FIG. 2, showing a system 200 according to some embodiments of the present invention. As shown, a system according to some embodiments of the invention may include a plurality of edge devices 210 that may be connected by a network 215. For example, edge devices 210 may be located in a geographically remote site. As further shown, a system according to some embodiments of the invention may include, or be connected to, a network 230. A system according to some embodiments of the invention may include, or be connected to, a server 240. Each of edge devices 210 may be or may include components of, computing device 100. In addition to components of computing device 100, edge devices 210 may include other components. For example, edge devices 210 may include sensors or other devices, e.g., a camera, a closed-circuit television (CCTV) camera or other video surveillance components. Edge devices 210 may include various other components, e.g., a microphone, a motion detector, a heat sensor and the like. It will be understood that any number of edge devices 210 may be included in a system and each of edge devices 210 may include a computing device and any additional sensors or other components. In some embodiments, each of edge devices 210 may be a network device as known in the art, e.g., each of edge devices 210 may include a network card or other component enabling it to communicate over a network. For example, each of edge devices 210 may be adapted to communicate with server 240 over a network. For example and as described herein, server 240 may be a cloud server and edge devices 210 may be configured to communicate with server 240 over a network (e.g., over the internet). For example, a router (not shown) by be installed on network 215 and may enable edge devices 210 to communicate with server 240 that may be connected to the internet.

Networks 215 and 230 may be, may comprise or may be part of a private or public IP network, or the internet, or a combination thereof. Additionally or alternatively, networks 215 and 230 may be, comprise or be part of a global system for mobile communications (GSM) network. For example, 215 and 230 may include or comprise an IP network such as the internet, a GSM related network and any equipment for bridging or otherwise connecting such networks as known in the art. In addition, 215 and 230 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of 215 and 230 are implied but not shown, e.g., access points, base stations, communication satellites, GPS satellites, routers, telephone switches, etc. It will be recognized that embodiments of the invention are not limited by the nature of 215 and 230 that may enable any components of system 200 to communicate. Server 240 may be any suitable computing device, e.g., a computing device similar to computing device 100 or server computer as known in the art. In some embodiments, edge devices 210 may communicate over network 230 and thus, network 215 may be omitted from a system without limiting the scope of the invention. In some embodiments server 240 may be a central or remote server on the cloud such that cloud computing as known in the art is enabled or supported by system 200. For example, rather than using a local server located at the site where edge devices 210 are located, server 240 may be a cloud server as known in the art and may be used to store, manage, and process data as described herein.

Edge device 220 may be designated, by the plurality of edge devices 210, as a master device. It will be understood that any one of the plurality of edge devices 210 may be designated as the master unit or master device. For example, all of edge devices 210 may include (e.g., in a memory 120) code that enables them to function as a master device as described herein. For example, a method of designating one of edge devices as the master device may be automatically performed or repeated upon discovering that none of edge devices 210 functions as a master device, e.g., in the case where an elected or designated master device stops functioning or is disconnected from network 215.

For example, when first connecting to network 215, each of edge devices 210 broadcasts identification information enabling all other edge devices 210 to know the edge device is now connected to network 215. An appearance of a new edge device on network 215 may trigger a leader or master device election process.

For example, each of edge devices 210 may periodically broadcast a unique identification parameter, e.g., its media access control (MAC) address, which, as known in the art, is unique per device on a network. Other unique identification parameters may be used, e.g., a port number or a serial number configured by a user and stored, e.g., on storage 130 of each of edge devices 210. Broadcasting as described herein may be as known in the art, e.g., sending a message to a broadcast address such that all devices on a network receive the message.

Each of edge devices 210 may maintain a list of all edge devices 210 on network 215. For example, each of edge devices 210 may periodically check a list of devices and remove devices it has not heard from in the last predefined period of time. New devices appearing on network 215 may be added to a local list in each of edge devices 210. Accordingly, at any given time, each of edge devices 210 may be aware of all other devices, e.g., a local list of all devices on network 215 may be maintained on each of edge devices 210. Other configurations may be contemplated. For example, a single list may be maintained on a server (not shown) on network 215 and each of edge devices 210 may periodically check the list on the server.

A topology may be set automatically and collaboratively by edge devices 210. For example, each of edge devices 210 run through the list of devices described herein and may select its ring successor to create ring topology. For example, a successor in the list may be selected by each edge devices 210 by selecting the device with the next, closest MAC address. The edge device with the highest MAC address may select the edge device with the lowest MAC address thus a ring may be defined. The ring (or other topology) may be re-defined upon appearance of a new device on the network. Various other methods as known in the art may be utilized by edge devices 210 in order to ensure that all of edge devices 210 are aware of each other and of a defined topology.

An appearance of a new device on network 215, e.g., in the form of a broadcast of a MAC address by device connected to network 215 may trigger a process of selecting or designating a master unit. Other events may trigger an automated process of selecting or designating a master unit. For example, removal (or disappearance) of a device from network 215 may trigger an automated process of selecting or designating a master unit or the process may be repeated periodically.

For example, a removal of one of edge devices 210 from network 215 may be detected by means of a failure detection algorithm, e.g., one of the gossip multicast variants known in the art. For example, the device that detects the failure broadcasts the fact to the network, triggering a new discovery round.

A change in a defined topology, a removal or addition of a device to/from network 215 or any other event may cause edge devices 210 to designate or re-designate one of edge devices 210 a master device. Any logic may be used to designate a master unit. For example, the device with the highest or lowest MAC address may be selected as the master device. As described, a similar or same list of devices and their MAC addresses may be present in, or available to, all edge devices 210, accordingly, edge devices 210 may all select the same device to be the master device.

Various methods may be used for designating or selecting a master device or unit. For example, in one embodiment, a process of designating a master device may start by all edge devices 210 setting the currently defined master device to null, e.g., upon receiving a broadcast message from a new device or being informed of a loss of a device.

Next, one of the well-known ring algorithms or other algorithms may be used. For example, the device starting the master device election sends a "Start Election" message to its successor including its identification parameter value (e.g., MAC address) in the message payload. A "Start Election" message may be any message sent over a network, for example, a message containing a predefined value, or the text "Start Election" in its header. An edge device receiving a "Start Election" message may do the following: If its own identification value is greater than the identification value received in the message it replaces the message identification value with its own identification value. An edge device may then send a "Start Election" message to its successor with the (possibly modified as described) identification value. If a device receives a message that includes its own identification value the device determines that the message has completed a full round through the ring and that it has the highest identification value on the network. In such case, the device may designate itself as a "candidate master unit" and may send an "Elected" message to its successor, including its identification value in the message. An "Elected" message may be any message sent over a network, for example, a message containing a predefined value, or the text "Elected" in its header.

Upon receipt an "Elected" message, a receiving edge device may log the indicated "Elected" or "candidate master unit" and may forward the message through the ring with no modifications. Each edge device may check if the elected identification value is its own, if it is, then this means that the message has completed a full circle of the ring, the device is the master unit, and the process of selecting a master unit is completed.

As further described herein, a master device designated or elected as described herein may represent the plurality of edge devices 210. For example, in the capacity of master unit, edge device 220 may represent all of edge devices 210 such that an application or user on server 240 may interact with the plurality of edge devices 210 as if they were a single entity or a managed site. For example, a user or application on server 240 may set the aggregated or collective data transfer rate of all of edge devices 210 by only interacting with edge device 220 as described herein.

For example, master device 220 may send a list of all edge devices 210 to a management application on server 240 and the management application may identify and/or record the list as a site. The management application may associate the site with a user, e.g., as known in the art. Attributes of the site, e.g., data upload rate or data transfer rate may be managed by interacting with master unit 220. For example, a user may set a data transfer rate for the site, inform master unit 220 of the data transfer rate and master unit 220 may control or manage edge devices 210 as described herein such that the collective data transfer rate of edge devices 210 is according to the setting of the transfer rate for the site. For example, the collective data rate of edge devices 210 may be controlled such that it is equal to, or less than, a data transfer rate of a site, where the site is the collection or edge devices 210.

Controlling data transfer rate may be achieved in various ways. For example, in an embodiment, edge devices 210 include cameras that capture and provide or produce video and/or audio content. To reduce data transfer rate, edge devices 210 may reduce the frame rate of the cameras and/or the resolution of the cameras as known in the art. Other methods may include compressing data captured by edge devices 210, filtering data and so on. For example, to reduce its data transfer rate, a device included in edge devices 210 may reduce the frame rate or resolution of a connected camera such that the amount of data produced and sent by the device is reduced. Similarly, to increase its data transfer rate, a device included in edge devices 210 may increase the frame rate or resolution of a connected camera such that the amount of data produced and sent by the device is increased.

According to some embodiments of the invention, each of edge devices 210 may check or determine its data transfer rate. For example, each of edge devices 210 may determine its data upload speed or rate and/or determine whether or not congestion occurs. The terms "network congestion" or "congestion" as referred to herein may be as known in the art. For example, the terms may relate to a loss of information transmitted over a network, a failure to transmit information over a network, or a situation wherein increasing the amount of data transmitted per a time unit, from a device to a network, does not result in an increase of the amount of data that actually passes through a network per unit of time (throughput). Measuring a data rate or and determining congestion are known in the art, each of edge devices 210 may determine its data rate or identify congestion as known in the art.

According to some embodiments of the invention, each of edge devices 210 may control its data transfer rate based on one or more flags of the edge device. A flag of a device as referred to herein may be a variable, e.g., a 16 bits integer as known in the art. For example, a flag may be a variable in a memory (e.g., in memory 120) or it may be a value stored in a storage system (e.g., in storage 130).

Master device 220 may dynamically set or modify the flags of edge devices 210. For example, using application programming interface (API), remote procedure call (RPC) or other methods known in the art, master device 220 may modify a flag in a memory of any of edge devices 210. For example, the flags of each device may be or may include an "Up" flag, a "Down" flag and a "Reset" flag. Each edge device may further include or have a "Data rate" parameter or value and a "Rate modification step" configuration parameter or value. For example, the "Up", "Down", "Reset" flags, and "Data rate" and "Rate modification step" configuration parameters may be memory segments in a memory of an edge device and the memory segment may be accessible to master device 220. For example, master device 220 may set an "Up", "Down" or "Reset" flag of an edge device to "TRUE" or "FALSE" and/or set "Rate modification step" configuration parameter of a device to 1 mega-bits per second (MBits/Sec). For example, the value of one "1" of a flag may be or may indicate "TRUE" and a value of zero in a flag may be or may indicate a "FALSE".

Various modes of operations of system 200 may be contemplated. For example, in one mode, the highest collective transfer rate (without congestion) may be desired. To achieve the highest collective transfer rate, each of edge devices 210 may increase its data transfer rate until congestion occurs. Upon detecting congestion, an edge device may wait a randomly determined time and re-check for congestion. For example, a random number generator as known in the art may be used by an edge device in order to select the time for waiting after congestion has been detected. Edge devices 210 may use a random backoff scheme (e.g., the known in the art binary exponential backoff), for example, to avoid a situation whereby all or some of edge devices 210 check for congestion at the same time and/or increase or decrease their data transfer rate at the same time.

For example, to avoid a situation wherein, upon a new condition of network 215 (e.g., upgrade of infrastructure, termination of a transfer of a large object etc.), all of edge devices 210 increase their data transfer rate at the same time, an edge device may wait a random time period between determining a network is not congested and increasing its data transfer rate. For example, if all (or even only some of) edge devices 210 detect excess network bandwidth at the same time and, consequently, all increase their data transfer rate at the same time then the sudden increase in the collective data transfer rate may occur, causing congestion that may in turn result in all (or a large number of) edge devices 210 reducing their data transfer rate and so on such that, with respect to congestion and data transfer rate system 200 may fluctuate in an undesirable manner.

If an edge device detected congestion, waited a randomly selected time period and detected congestion again, the device may check whether its "Down" flag is set to true or false. If the "Down" flag is set to true, the edge device may reduce its data transfer rate. For example, if the edge device is uploading video and/or audio content captured by a connected camera, the edge device may decrease the frame rate of the camera and/or decrease the resolution of the camera such that the data transfer rate from the edge device is reduced. Other means of reducing data rate may be decreasing a bit rate of audio content, compressing data, limiting the amount of data sent over networks 215 and/or 230 per unit time as known in the art and the like. It will be understood that any methods or systems for reducing, increasing or controlling a data transfer rate may be used by edge devices 210 in order to increase or reduce data rate.

Reducing data transfer rate by an edge device as described herein may be in steps, or hops, e.g., based on a step or hop indicated in a "Rate modification step" configuration parameter or value of the edge device. A "Rate modification step" configuration parameter or value of an edge device included in edge devices 210 may be set or modified by master device 220. For example, a "Rate modification step" may indicate a frame rate reduction number or percentage, a resolution reduction step or value, a step or hop defined by MBits/Sec and so on. A "Rate modification step" configuration parameter or value may be preset combination of frame rate and resolution of a camera such that changing (either increasing or decreasing) a data transfer rate by an edge device as described herein is achieved by changing both a frame rate and resolution of a camera connected to the edge device.

In some embodiments, a first "Rate modification step" value may govern reduction of transfer rate and a second "Rate modification step" value may govern an increase of transfer rate such that different steps may be used by edge devices 210 for increasing and decreasing of data transfer rates, After reducing its data rate, an edge device may set its "Down" flag to false. When or if a "Down" flag of an edge device is set to false, the edge device may refrain from further reducing its data rate. If, after one or more of edge devices 210 reduced their data transfer rate congestion is still detected (e.g., on network 215) by other edge devices included in edge devices 210 then those other device will also reduce their data transfer rate and set their respective "Down" flags to false. If all of edge devices 210 detect congestion then eventually the "Down" flags of all edge devices 210 will be set to false.

Master device 220 may periodically or otherwise check the flags of edge devices 210 and may dynamically set or manipulate the flags of edge devices 210 such that controlling the data transfer rate by the plurality of edge devices is synchronized. A first synchronization aspect may be realized by the "Down" flag as described. For example, since an edge device may not reduce its data transfer rate after doing so and setting its "Down" flag to false, each of edge devices 210 will only decrease its data transfer rate once before its "Down" flag is set to true. Accordingly, all of edge devices 210 may decrease their data transfer rate once if congestion is detected. For example, a situation wherein one of edge devices 210 reduces its data transfer rate three times (or by three steps) while another one of edge devices 210 does not reduce its data transfer rate is avoided, accordingly, reduction of data transfer rate is synchronized.

As described, master device 220 may periodically or otherwise check the "Down" flags of all of edge devices 210. If master device 220 determines that the "Down" flags of all edge devices 210 are set to false, master device 220 may set the "Down" flags of all edge devices 210 to true. Accordingly, a new round of synchronized data transfer rate reduction as described herein may commence. A synchronized data transfer rate reduction as described may be repeated any number of times, e.g., restart until network 215 is no longer congested. It is noted that a synchronized data transfer rate reduction may guarantee that a collective network bandwidth or a collective data transfer rate are equally allocated or distributed to edge devices and a situation where a single edge device is starved is avoided.

A system and method according to some embodiments of the invention may enable or include a synchronized data transfer rate increase. For example, if an edge device detects no congestion (e.g., determines its uplink is not congested and/or that excess bandwidth is available) it may check its "Up" flag. If an "Up" is set to true and no congestion is detected, an edge device may increase its data transfer rate by a step, e.g., as indicated by a "Rate modification step" configuration parameter related to increasing data transfer rate. After increasing its data transfer rate, an edge device may set its "Up" flag to false thus disabling itself from further increasing its data transfer rate. If no congestion is detected by other edge devices then they too will increase their data transfer rate, set their "Up" flags to true and avoid further increase of their respective data transfer rates. Master device 220 may periodically or otherwise check the "Up" flags of all of edge devices 210. If master device 220 determines that the "UP" flags of all edge devices 210 are set to false, master device 220 may set the "Up" flags of all edge devices 210 to true. Accordingly, a new round of synchronized data transfer rate increase as described herein may commence.

It is noted that a synchronized data transfer rate increase may guarantee that a collective network bandwidth or a collective data transfer rate are equally allocated or distributed to edge devices and a situation where a single edge device keeps increasing its data transfer rate while another edge devices keeps detecting congestion is avoided.

For example, considering a first and second edge devices "A" and "B", if both devices detect congestion on network 215, device "A" may reduce its data transfer rate, set its "Down" flag to false and refrain from further decreasing its data transfer rate until master device 220 sets its "Down" flag to true. As long as the "Down" flag of edge device "B" is set to true, master device 220 may refrain from setting the "Down" of edge device "A" to true. Eventually, e.g., if network 215 remains congested, edge device "B" will reduce its data transfer rate and set its "Down" flag to false. Accordingly, a situation wherein edge device "A" will keep reducing or decreasing its data transfer rate while edge device "B" maintains its data transfer rate is avoided and therefore fairness is achieved.

Any method or system for determining a network is not congested (or determining a condition of excess bandwidth as known in the art) may be used. For example, in the case where data sent by edge devices 210 is the output of a camera, congestion or lack thereof, may be determined by monitoring the timestamps of frames of a video-stream being uploaded and comparing the timestamps to a real-time clock or to a rate at which the camera produces frames.

In a simplified configuration of a system or a method according to some embodiments of the invention, master device 220 may only set the "Up" and "Down" flags to true (e.g., when all "Up" and/or "Down" flags of all edge devices 210 are set to false) and edge devices 210 may only set their the "Up" and "Down" flags to false, e.g., after "hopping" to the next up or down preset or configured level, e.g., a level or hop indicated by a relevant "Rate modification step" parameter.

Some embodiments of systems and methods according to the invention ensure that a collective data transfer rate of edge devices 210 will not fluctuate around some specific value, e.g., in a case where the hops or steps of increasing or decreasing the data transfer rate are too large. It can be shown a system according to some embodiments of the invention will eventually stabilize to a collective data transfer rate that is beneath the value of the available collective data transfer rate such that the collective data transfer rate will not fluctuate. The time to reach a stabilized, non-fluctuating condition is a function of the number "N" of edge devices in system, where the number of fluctuations is of order N.

According to some embodiments of the invention, a master unit or device may periodically or upon detecting specific conditions, set a "Reset" flag to true on some or all of edge devices 210. When or if an edge device detects or determines its "Rest" flag is set to true, the edge device may set its "Reset" flag to false and may further set its data transfer rate to a configured default value. For example, where applicable, the "Reset" flag may be similar to the "Up" flag described herein and a default data transfer rate value may be set by master unit 220 for each of edge devices 210, e.g., by setting a value in a variable in a memory of an edge device as described, setting a value in a list accessible to all edge devices etc. When setting a "Reset" flag to true, master device 220 may also set other flags. For example, master device 220 may reset a system by setting the, the "Reset", "Up" and "Down" flags of all edge devices 210 to true to cause a system to adjust or re-adjust its collective data transfer rate.

Below is an exemplary pseudo code that may be used by an edge device and a master device as described herein:

```
At each device do the following:
    if congestion has been detected do:
        if the "Down" flag is true do:
            wait random timeout
            re-check for congestion
            if still congested do:
                reduce the data transfer rate to the next preset level.
                set "Down" flag to false
            end
        end
    else if excess bandwidth is detected do:
        if the "Up" flag is true do:
            wait random timeout
            recheck excess bandwidth
            if there is still excess bandwidth do:
                increase the data transfer rate to the next preset level
                set "Up" flag to false
            end
        end
    end
    if device reset flag is true do:
        set data transfer rate to default preset
        set reset flag to false
    end
    At the master unit:
```

```
if all "Up" flags are false do:
    set all "Up" flags to true
end
if all "Down" flags are false do:
    set all "Down" flags to true
end
```

As described, various configurations or modes of operations of system 200 may be contemplated. For example, master device 220 may set a data transfer rate threshold for each of the plurality of edge devices 210 such that a cumulative data transfer rate of the plurality of edge devices 210 is according to a desired, requested or configured total data transfer rate.

For example, in one mode, the collective transfer rate (without congestion) of a site (e.g., a site including edge devices 210) may be set or configured to a specific value or threshold. For example, a user may set a total or collective upload rate for the set of edge devices 210 (viewed as a site) by sending a single message that contains the desired value to master device 220.

Master device 220 may divide a received desired data transfer rate value by the number of edge devices 210 and set a data transfer rate value or flag for each of edge devices 210. For example, a data transfer rate value may be set for an edge device by writing the value to a predefined location in a memory of the edge device, e.g., as described herein with reference to flags. Instead of, or in addition to, checking congestion as described herein, edge devices 210 may each periodically or continuously measure its data transfer rate and, if congestion is detected or the data transfer rate is above the data transfer rate value set for the device by the master device, the edge device may reduce or decrease its data transfer rate, e.g., synchronously with other edge devices as described herein. Master device 220 may prioritize one or more edge devices, for example, by setting their data transfer rate value higher than the value set for other devices.

As described, master device 220 may set a specific data transfer rate for a specific one of edge devices 210. For example, based on an event, time of day or a request from a user or application, master device 220 may raise or lower a data transfer rate threshold for one of edge devices 210 or for a group of edge devices included in edge devices 210.

For example, if, based on video analysis, a motion is detected in an area covered by a camera connected to an edge device, the edge device may send a message to master device 220 informing of the event. Based on an event such as motion detection, detection of abnormal heat (e.g., by a heat sensor) on entrance into a restricted area (e.g., by a door sensor), master device 220 may perform one or more actions. For example, based on an event, master device 220 may raise a data transfer rate threshold of an edge device, set the data transfer rate threshold to a high level, set a flag in the edge device causing the edge device to ignore congestion and attempt to upload as much data as possible and so on. For example, a "Priority" flag in all edge devices may be set to true or false by master device 220 and, when set to true, the flag may cause an edge device to override logic described herein and increase its data transfer rate to a maximum. Accordingly, a system and method may dynamically prioritize edge devices such that in case of need, a specific device may be granted as much network bandwidth as possible.

In order to prioritize an edge device or a set of edge devices, master device 220 may lower the data transfer rate threshold of other edge devices thus providing a prioritized device or set of devices with as much network bandwidth or data transfer rate. In other cases, master device 220 may set the "Up" flag of a prioritized device to true whenever it detects the device's "Up" flag is set to false. For example, to prioritize a specific one of edge devices 210, master device 220 may continuously or periodically check the device's "Up" flag and set it to true if it is set to false thus effectively causing the prioritized device to freely increase its data transfer rate irrespective of limits imposed on other devices. In another embodiment, a data transfer rate threshold as described herein may be set to a high value for prioritized edge devices and low for other, non-prioritized edge devices.

Other means may be used. For example, a flag may be used to cause an edge device to ignore the "Up" and "Down" flags described herein. For example, an "Ignore" flag in each of edge devices 210 that may be set or cleared (e.g., using the values of "1" and "0") by master device 220 may be checked by edge devices 210 before increasing or decreasing their data transfer rate and manipulating their "Up" and "Down" flags as described. For example, if an "Ignore" flag of an edge device is set (e.g., has the value of "1"), the edge device may ignore its "Up" and/or "Down" flags and may freely increase its data transfer rate as required, e.g., by increasing a resolution or frame rate of an attached camera to the maximal values.

In some embodiments, each of edge devices 210 has a "Priority" flag that may be set or cleared (e.g., set to "true" or "false" or "1" or "0") by master device 220. When an edge device is given priority, e.g., its priority flag is set to true, the edge device may set its bandwidth, upload rate or data transfer rate to a maximal (or other predefined) value and may refrain from testing for congestion or checking its "Up" and/or "Down" flags as long as the priority flag is set to true. As a result, less bandwidth may be available to other edge devices, and, since the other edge devices may continue to participate in the bandwidth control mechanism or scheme described herein, the other edge devices may adapt automatically to the new total available bandwidth. When the priority flag of the edge device is cleared, the edge device may revert to the operational mode described herein, e.g., control its data transfer rate according to its "Up" and "Down" flags as described. Upon resuming control of data transfer rate according to flags as described, an edge device may set its bandwidth to a minimum predefined setting and may increase its data transfer rate in steps as described herein. Accordingly, a collective data transfer rate may be gradually increased even when edge devices change their operational mode, move from one operational mode to another, or change the logic used for controlling their data transfer rate.

Figure 3:
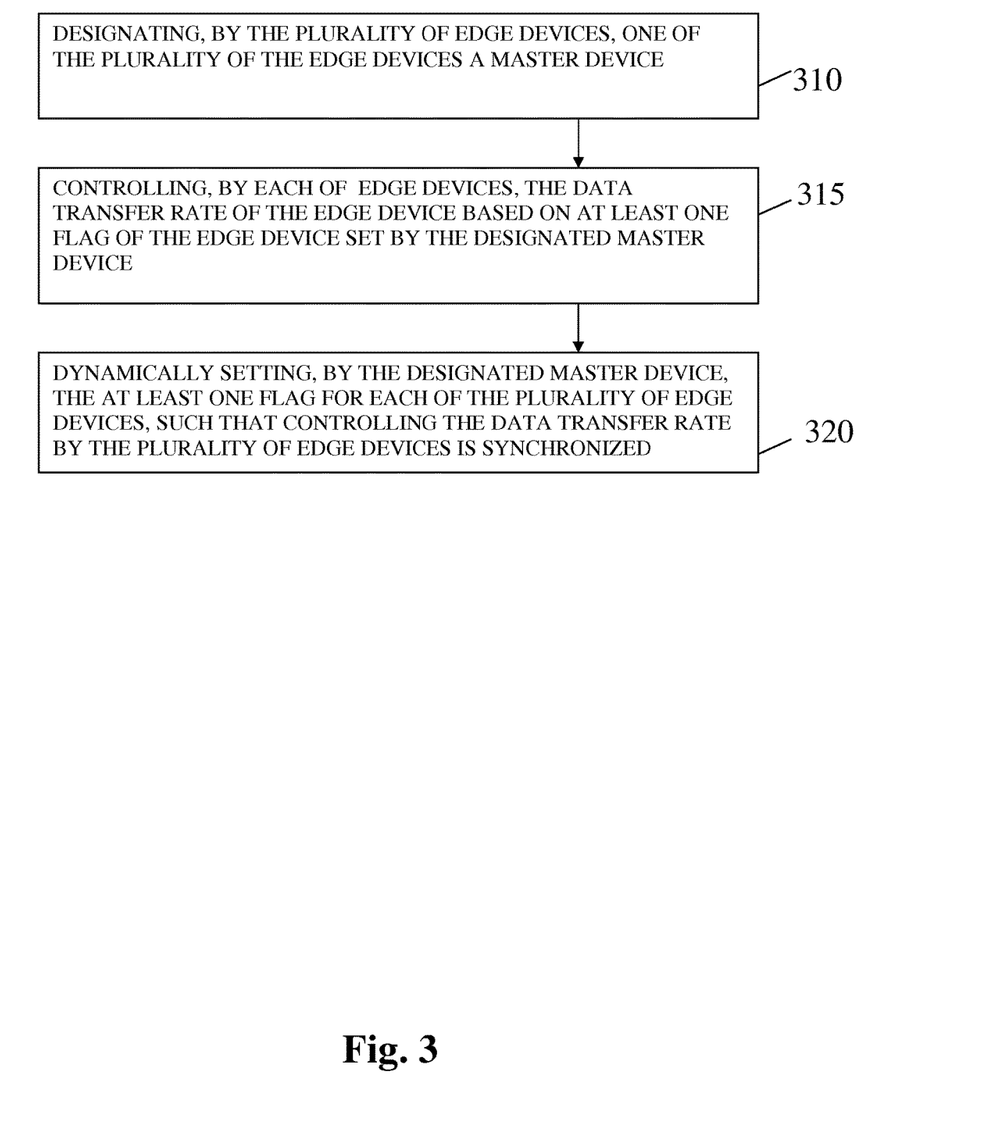
FIG. 3 shows a flow a according to some embodiments of the present invention.

Reference is made to FIG. 3, showing a flow according to some embodiments of the present invention. As shown by block 310, a plurality of edge devices may designate one of the plurality of the edge devices a master device. For example, an automated autonomous process carried out by edge devices 210 may designate edge device 220 as a master unit or master device as described. As shown by block 315, controlling of a data transfer rate of an edge device may be done, by the edge device, based on at least one flag of the edge device set by the designated master device. For example, based on flags and configuration parameters set, changed or manipulated by master device 220, each of edge devices 210 may increase or decrease its data transfer rate. As shown by block 320, a designated master device may dynamically set at least one flag for each of the plurality of edge devices, such that controlling the data transfer rate by the plurality of edge devices is synchronized. For example, master device 220 may dynamically set or change flags in edge devices 210 such that controlling the collective or total data transfer of edge devices 210 is synchronized as described herein.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing a collective data transfer rate of a plurality of edge devices, the method comprising:
   designating, by the plurality of edge devices, one of the plurality of the edge devices a master device;
   controlling, by each edge device, the data transfer rate of the edge device based on at least one flag of the edge device set by the designated master device;
   dynamically setting, by the designated master device, the at least one flag for each of the plurality of edge devices, such that the controlling the data transfer rate by the plurality of edge devices is synchronized;
   at each edge device:
      if network congestion has been detected and a "Down" flag of the edge device is set to "true" then reducing the data transfer rate of the edge device by a predefined step and setting the "Down" flag of the edge device to "false"; and
   at the designated master device:
      if the "Down" flags of all edge devices are set to "false" then setting the "Down" flags of all edge devices to "true".

2. The method of claim 1, wherein the edge devices include a camera and wherein controlling the data transfer rate includes controlling one of: a frame rate of the camera and a resolution of the camera.

3. The method of claim 1, comprising:
   at each edge device:
      if excess network bandwidth is detected and an "Up" flag of the edge device is set to "true" then increasing the data transfer rate of the edge device and setting the "Up" flag of the edge device to "false"; and
   at the designated master device:
      if the "Up" flags of all edge devices are set to "false" then set all "Up" flags of all edge devices to "true".

4. The method of claim 1, comprising:
   at the designated master device:
      setting, for at least some of the edge devices a data transfer rate threshold; and
   at each of the at least some of the edge devices:
      controlling the data transfer rate of the edge device based on the data transfer rate threshold.

5. The method of claim 1, comprising setting, by the designated master device, a data transfer rate threshold for each of the plurality of edge devices, such that a cumulative data transfer rate of the plurality of edge devices is according to a desired total data transfer rate.

6. The method of claim 5, comprising setting, by the designated master device, a data transfer rate threshold for an edge device based on an event.

7. A method of managing a data transfer rate of a site, the method comprising:
   controlling, by each of a plurality of edge devices in a site, the data transfer rate of the edge device based on at least two flags of the edge device;
   dynamically setting, by a master device, the at least two flags for each of the plurality of edge devices, such that a collective data transfer rate of the plurality of edge devices is maintained at a desired value;
   at each edge device:
      only reducing the data transfer rate of the edge device if a "Down" flag of the edge device is set to "true";
      only increasing the data transfer rate of the edge device if an "Up" flag of the edge device is set to "true"; and
   at the master device:
      if the "Down" flags of all edge devices are set to "false" then setting the "Down" flags of all edge devices to "true", and
      if the "Up" flags of all edge devices are set to "false" then setting the "Up" flags of all edge devices to "true".

8. The method of claim 7, comprising:
   at the master device:
      setting a data transfer rate threshold for an edge device; and
   at the edge device:
      setting a data transfer rate of the edge device according to the threshold regardless of the at least two flags.

9. The method of claim 7, comprising designating, by the plurality of edge devices, one of the plurality of the edge devices the master device.

10. A system comprising:
    a plurality of edge devices each comprising a first hardware processor, wherein at each edge device:
       if network congestion has been detected and a "Down" flag of the edge device is set to "true" then reducing the data transfer rate of the edge device by a predefined step and setting the "Down" flag of the edge device to "false"; and
    a master device comprising a second hardware processor, wherein at the master device:
       if the "Down" flags of all edge devices are set to "false" then setting the "Down" flags of all edge devices to "true".

11. The system of claim 10, wherein:
    at each edge device:
       if excess network bandwidth is detected and an "Up" flag of the edge device is set to "true" then increasing the data transfer rate of the edge device and setting the "Up" flag of the edge device to "false"; and
    at the designated master device:
       if the "Up" flags of all edge devices are set to "false" then set all "Up" flags of all edge devices to "true".

12. The system of claim 10, wherein:
    at the master device:
       setting, for at least some of the edge devices a data transfer rate threshold; and
    at each of the at least some of the edge devices:
       controlling the data transfer rate of the edge device based on the data transfer rate threshold.

13. The system of claim 10, comprising setting, by the master device, a data transfer rate threshold for each of the plurality of edge devices, such that a cumulative data transfer rate of the plurality of edge devices is according to a desired total data transfer rate.

14. The system of claim 13, comprising setting, by the master device, a data transfer rate threshold for an edge device based on an event.

15. The system of claim 10, wherein one of the plurality of edge devices is designated as a master device by the plurality of the edge devices.

* * * * *